United States Patent [19]
Ishikawa

[11] Patent Number: 5,136,649
[45] Date of Patent: Aug. 4, 1992

[54] FM STEREOPHONIC RECEIVER

[76] Inventor: Tsutomu Ishikawa, 427-16 Higashi-Bessho, Ota-shi, Gumma-ken, Japan

[21] Appl. No.: 526,830

[22] Filed: May 22, 1990

[30] Foreign Application Priority Data

May 25, 1989 [JP] Japan .................. 1-132055

[51] Int. Cl.$^5$ .................. H04S 3/00
[52] U.S. Cl. .................. 381/22
[58] Field of Search .................. 381/22, 18

[56] References Cited

U.S. PATENT DOCUMENTS

| | | |
|---|---|---|
| 3,772,479 | 11/1973 | Hilbert . |
| 3,959,590 | 5/1976 | Scheiber . |
| 4,162,457 | 7/1979 | Grodinsky . |
| 4,390,749 | 6/1983 | Pearson . |
| 4,941,177 | 7/1990 | Mandell et al. .................. 381/22 |

Primary Examiner—Forester W. Isen
Attorney, Agent, or Firm—Darby & Darby

[57] ABSTRACT

An FM stereophonic receiver for receiving FM stereophonic broadcast signals, which includes a first comparison circuit for generating a first control signal corresponding to ratio of a left stereo signal (L) to a right stereo signal (R), a first separation circuit for separating the first control signal into a left dominant signal and a right dominant signal, a second comparison circuit for generating a second control signal corresponding to ratio of a stereo sum signal (L+R) to a stereo difference signal (L−R), a second separation circuit for separating the second control signal into a sum dominant signal and a difference dominant signal, a first level control circuit for controlling an output signal level of a stereo multiplex circuit through employment of the left and right dominant signals and the sum and difference dominant signals, a level detection device for detecting level of the second control signal, and a second level control circuit for controlling level of the difference dominant signal according to an output signal of the level detection device.

3 Claims, 2 Drawing Sheets

FM STEREOPHONIC RECEIVER

BACKGROUND OF THE INVENTION

The present invention generally relates to a radio receiver for receiving FM stereophonic broadcast signals, and more particularly, to an FM stereophonic receiver which is capable of improving apparent separation between channels by controlling output signal level of a stereo multiplex circuit.

Commonly, for receiving FM stereophonic broadcast signals, it is normally so arranged to subject the broadcast signals to FM detection through employment of an FM detection circuit, and to separate the detection output signal into left and right stereo signals (L) and (R) by using a stereo multiplex circuit for applying said stereo signals to left and right speakers after amplification thereof by an audio frequency amplifier circuit.

In connection with the above, there have also been conventionally proposed a three-channel system which employs, in addition to the left and right speakers, a center speaker to which the stereo sum signal (L+R) contained in the FM detection output signal or stereo sum signal (L+R) prepared through addition of the separated left and right stereo signals is applied, and also, a four-channel system which employs, together with said center speaker, a rear speaker to which the stereo difference signal (L−R) contained in the FM detection output signal or stereo difference signal prepared through subtraction of the separated left and right stereo signals is applied. Thus, by effecting expansion of channels as described above, it becomes possible to improve positions and expansion of sounds for better stereophonic effect.

However, by the mere expansion of channels as described above, it was not yet sufficient to achieve optimum results, and a system capable of improving the stereophonic effect still further has been required for the purpose.

SUMMARY OF THE INVENTION

Accordingly, an essential object of the present invention is to provide an FM stereophonic receiver which is capable of improving apparent separation between channels through proper control of an output signal level of a stereo multiplex circuit.

Another object of the present invention is to provide an FM stereophonic receiver of the above described type which is simple in construction and stable in functioning at high reliability for production at low cost.

In accomplishing these and other objects, according to one preferred embodiment of the present invention, there is provided an FM stereophonic receiver for receiving FM stereophonic broadcast signals, which includes a first comparison circuit for generating a first control signal corresponding to ratio of a left stereo signal (L) to a right stereo signal (R), a first separation circuit for separating said first control signal into a left dominant signal and a right dominant signal, a second comparison circuit for generating a second control signal corresponding to ratio of a stereo sum signal (L+R) to a stereo difference signal (L−R), a second separation circuit for separating said second control signal into a sum dominant signal and a difference dominant signal, a first level control circuit for controlling an output signal level of a stereo multiplex circuit through employment of said left and right dominant signals and said sum and difference dominant signals, a level detection means for detecting level of said second control signal, and a second level control circuit for controlling level of said difference dominant signal according to an output signal of said level detection means.

By the arrangement according to the present invention as described above, it is possible to judge which of the left and right stereo signals and stereo sum and difference signals are dominant, through employment of first and second control signals to be obtained from first and second comparison circuits. Since it is so arranged to effect the level control of the output signal of the stereo multiplex circuit, signals emphasized in the directivity may be applied to the left and right speakers, center speaker, and rear speaker. Furthermore, owing to the arrangement to control the level of the difference dominant signal through detection of the level of the second control signal, emphasis of wrong directivity by an abnormal modulation may be advantageously prevented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
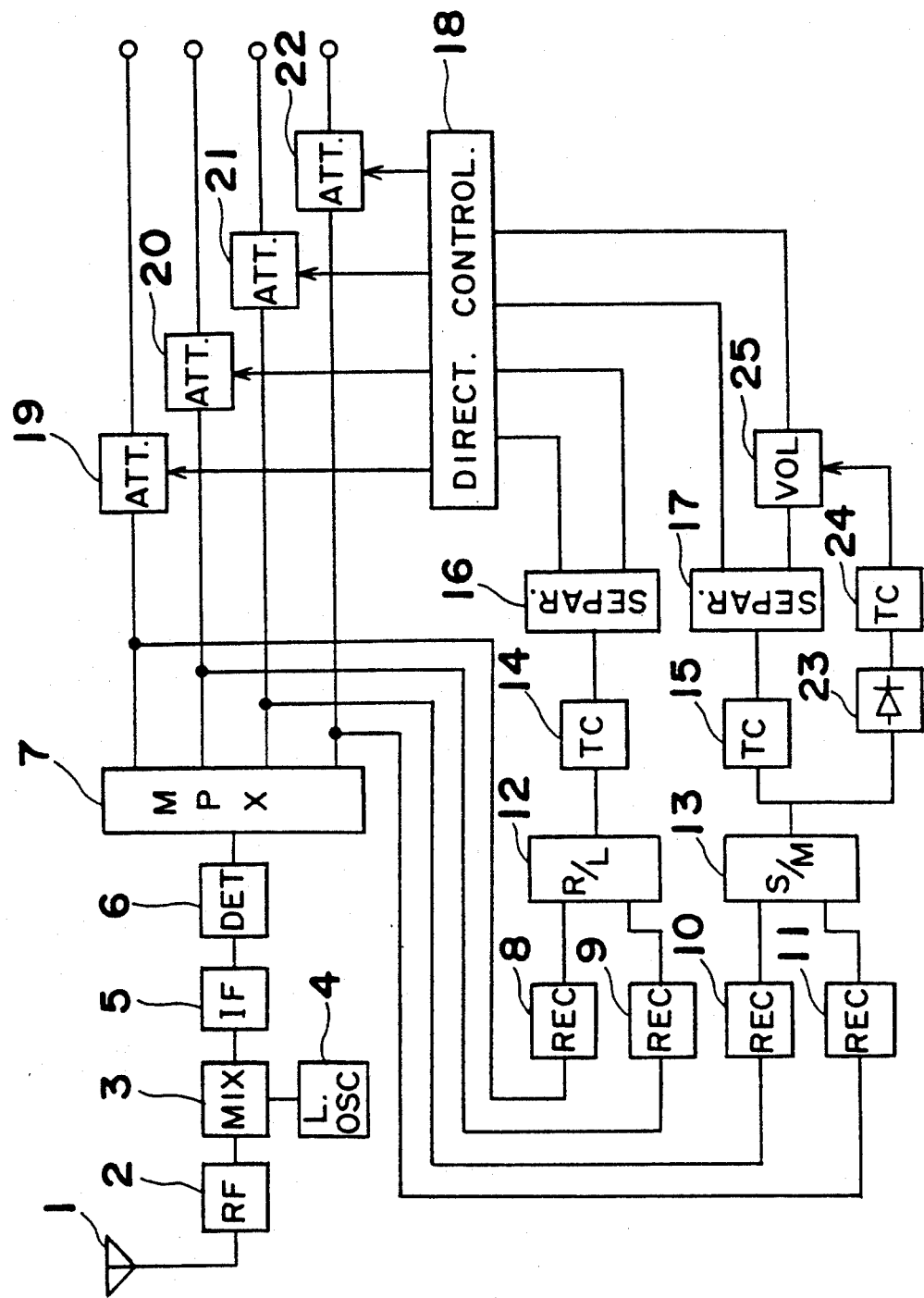
FIG. 1 is a circuit diagram showing a general construction of an FM stereophonic receiver according to one preferred embodiment of the present invention.

Before the description of the present invention proceeds, it is to be noted that like parts are designated by like reference numerals throughout the accompanying drawings.

Referring now to the drawings, there is shown in FIG. 1, a general circuit construction of an FM stereophonic receiver according to one preferred embodiment of the present invention.

In FIG. 1, an antenna 1 for receiving an FM stereophonic broadcast signal is coupled, though an RF (radio frequency) amplifier circuit 2 for amplifying the RF signal received by the antenna 1, a mixer circuit 3 for preparing an IF (intermediate frequency) signal by mixing the amplified RF signal with an output signal of a local oscillation circuit 4, an IF amplifier circuit 5 for amplifying the IF signal, and an FM detection circuit 6 for detecting the amplified IF signal, with a stereo multiplex circuit 7 for separating left and right stereo signals (L) and (R) from stereo sum signal (L+R) and stereo difference signal (L−R) contained in an output signal of said FM detection circuit 6. The outputs of the stereo multiplex circuit 7 are respectively connected to first to fourth rectifier circuits 8,9,10, and 11, while the first and second rectifier circuits 8 and 9 are connected to a first comparison circuit 12 for setting a level ratio of output signals of said circuits 8 and 9, and the third and fourth rectifier circuits 10 and 11, to a second comparison circuit 13 for setting a level ratio of output signals of said circuits 10 and 11. The output of the first comparison circuit 12 is connected through a first time constant circuit 14, to a first separation circuit 16 for separating the output signal of said first time constant circuit 14 into left and right dominant signals, and the output of the second comparison circuit 13 is connected through a second time constant circuit 15, to a second separation circuit 17 for separating the output signal of said second time constant circuit 15 into sum dominant signal and difference dominant signal. The outputs of the first and second separation circuits 16 and 17 are connected to a direction control circuit 18 which produces first to fourth output signals according to output signals of the first and second separation circuits 16 and 17, with the first to fourth outputs of said direction control circuit 18 being respectively connected to corresponding first to fourth attenuation circuits 19,20, 21 and 22 also coupled with the multiplex circuit 7 so as to attenuate the outputs of said multiplex circuit 7 according to the first to fourth output signals of said direction control circuit 18. The output of the second comparison circuit 13 is also connected, through a fifth rectifier circuit 23 for subjecting the output signal of the second comparison circuit 13 to a half-wave rectification and a third time constant circuit 24 for setting attack and recovery time of smoothing, to a second level control circuit 25 including a variable resistor and inserted between the second separation circuit 17 and the direction control circuit 18 for subjecting the output difference dominant signal of the second separation circuit 17 to level control according to the output of said time constant circuit 24. It is to be noted here that the direction control circuit 18, and the first to fourth attenuation circuits 19 to 22 constitute a first level control circuit.

By the above arrangement, the FM stereophonic signals received by the antenna 1 is subjected to the RF amplification, conversion into IF signal, and FM detection in the similar manner as in the conventional FM stereophonic receiver. Thus, at the stereo multiplex circuit 7, left and right stereo signals (L) and (R) are separated from stereo sum signal (L+R) and stereo difference signal (L−R) contained in the output signal of the FM detection circuit 6. Therefore, at the output terminals of the stereo multiplex circuit 7, the left and right stereo signals (L) and (R), stereo sum signal (L+R) and stereo difference signal (L−R) may be respectively produced.

The signals obtained at the output terminals of the stereo multiplex circuit 7 are subjected to rectification by the first to fourth rectifier circuit 8 to 11, and respectively applied to the first and second comparison circuits 12 and 13. From the first comparison circuit 12, the output signal corresponding to the level ratio of the left and right stereo signals (L) and (R) is produced, while from the second comparison circuit 13, the output signal corresponding to the level ratio of the stereo sum and difference signals (L+R) and (L−R) is produced. Since the first and second comparison circuits 12 and 13 are described in details in Japanese Patent Application No. 63-180516, reference should be made thereto for further details thereof.

The first and second control signals to be generated by the first and second comparison circuits 12 and 13 are respectively applied to the first and second separation circuits 16 and 17 through the first and second time constant circuits 14 and 15. The first separation circuit 16 separates said first control signal into the left dominant signal and the right dominant signal, while the second separation circuit 17 separates said second control signal into the sum dominant signal and the difference dominant signal.

Figure 2A:
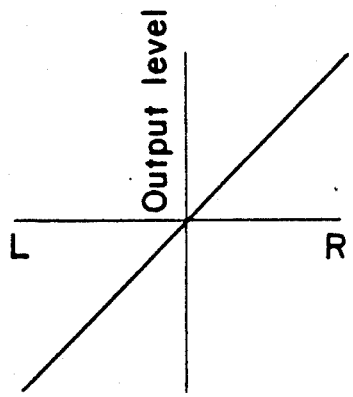
FIGS. 2(a) to 2(f) are characteristic diagrams for explaining functionings of the FM stereophonic receiver of FIG. 1.
Figure 2B:
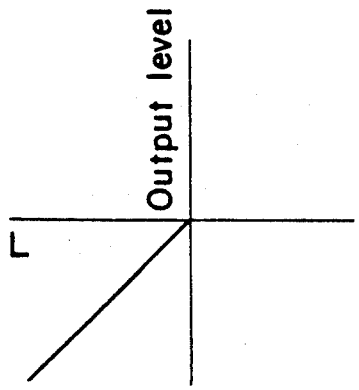
Figure 2C:
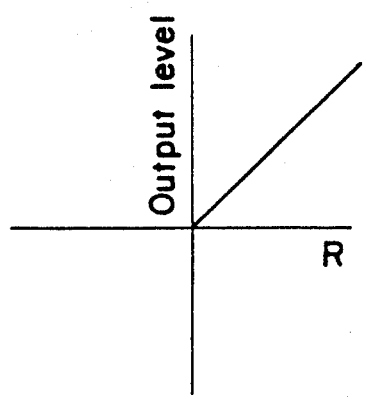
Figure 2D:
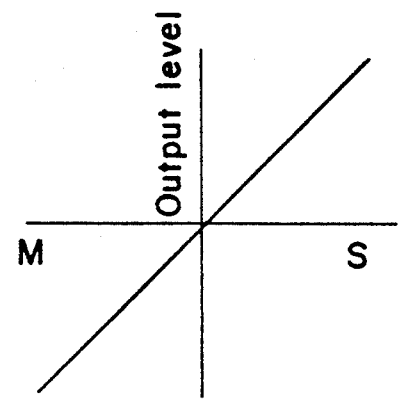
Figure 2E:
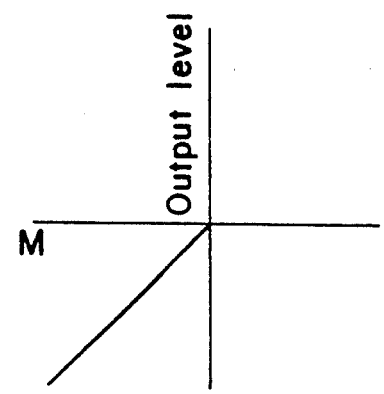
Figure 2F:
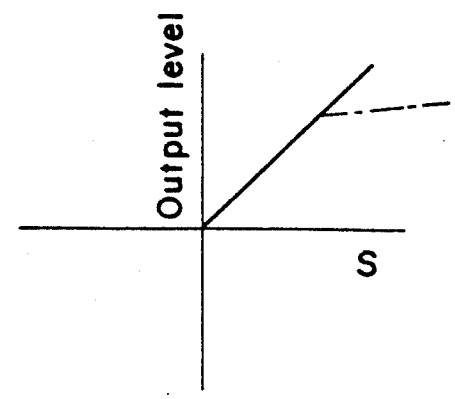

FIG. 2(a) shows the first control signal, FIG. 2(b) denotes the left dominant signal, FIG. 2(c) shows the right dominant signal, FIG. 2(e) represents the sum dominant signal, and FIG. 2(f) shows the difference dominant signal respectively.

The output signals of the first and second separation circuits 16 and 17 are applied to the direction control circuit 18, which produces the first to fourth output signals for emphasizing one of the signals in the output signals of the stereo multiplex circuit 7, and drives the first to fourth attenuation circuits 19 to 22 for attenuating the remaining three signals. For example, when only the left dominant signal is produced in the output signals of the first and second separation circuits 16 and 17, according to the second and third output signals of the direction control circuit 18, the right stereo signal (R), stereo sum signal (L+R) and stereo difference signal (L−R) are attenuated by a predetermined degree, and consequently the left stereo signal (L) is relatively emphasized.

Incidentally, in the ordinary FM broadcast, there are cases where the stereo difference signal (L−R) is deliberately emphasized during encoding at a broadcasting station. If such an FM stereophonic broadcast signal emphasized in the stereo difference signal is received, and further stressed in its directivity, there may arise such a problem that the signal to be located at the forward position is rapidly shifted rearward, thus undesirably giving an unnatural feeling to a listener.

In order to eliminate the problem as describe above, according to the present invention, the FM stereophonic receiver is provided with the fifth rectifier circuit 23, third time constant circuit 24 and second level control circuit 25, the functions of which will be described in detail hereinafter.

The output signal of the second comparison circuit 13 takes a positive value when the stereo difference signal (L−R) (represented by S) is dominant, and a negative value when the stereo sum signal (L+R) (represented by M) is dominant as shown in FIG. 2(d). Thus, the fifth rectifier circuit 23 rectifies the output signal in the positive value so as to be applied to the level control circuit 25 through the third time constant circuit 24. In the case where the stereo difference signal (L−R) is the signal not emphasized, the output signal of the fifth rectifier circuit 23 falls below a predetermined level, and the second level control circuit 25 does not start the level control function. Therefore, the difference dominant signal produced by the second separation circuit 17 is applied to the direction control circuit 18, with the level thereof held as it is.

On the other hand, upon receipt of the signal emphasized in the stereo difference signal (L−R), the level of the positive output signal of the second comparison circuit 13 becomes large and the output signal level of the fifth rectifier circuit 23 also becomes large, whereby the second level control circuit 25 starts functioning. Therefore, the second level control circuit 25 functions according to the output signal level of the fifth level control circuit 23, and thus, the level control of the second separation circuit 17 is effected. As a result, the difference dominant signal varies as shown by one dotted chain line in FIG. 2(f) so as to be applied to the direction control circuit 18, and thus, the state in which the sound is located abnormally rearward may be prevented.

It is to be noted here that the above arrangement may be, for example, so modified that the second level control circuit 25 is constituted by a switch means and said switch means is arranged to be opened when the output signal level of the fifth rectifier circuit 23 exceeds the predetermined value, thereby to suspend transmission of the difference dominant signal.

As is clear from the foregoing description, according to the present invention, since the emphasis of the directivity may be effected according to the state of receiving signals, apparent separation can be improved for better presence or realism of sounds. Particularly, owing to the arrangement to lower the level when the stereo difference signal (L−R) is abnormally dominant, reception without an unnatural feeling may be effected even when an extreme emphasis is made at the broadcasting station.

Although the present invention has been fully describe by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An FM stereophonic receiver for receiving FM stereophonic broadcast signals, which comprises:
    a first comparison circuit for generating a first control signal corresponding to the ratio of a left stereo signal (L) to a right stereo signal (R),
    a first separation circuit for separating said first control signal into a left dominant signal and a right dominant signal,
    a second comparison circuit for generating a second control signal corresponding to the ratio of a stereo sum signal (L+R) to a stereo difference signal (L−R),
    a second separation circuit for separating said second control signal into a sum dominant signal and a difference dominant signal,
    a first level control circuit for controlling an output signal level of a stereo multiplex circuit through employment of said left and right dominant signals and said sum and difference dominant signals,
    a level detection means for detecting the level of said second control signal and for producing an output signal in response thereto, and
    a second level control circuit responsive to said level detection means and an output of said second separation circuit for controlling the level of said difference dominant signal in response to the output signal of said level detection means being above a predetermined value.

2. An FM stereophonic receiver as claimed in claim 1, wherein said second level control circuit includes a variable resistance means which is arranged to vary resistance value thereof according to an output signal level of said level detection means.

3. An FM stereophonic receiver as claimed in claim 1, wherein said second level control circuit includes a switch means which is arranged to be controlled according to an output signal above a predetermined level of said level detection means so as to stop transmission of the dominant signal.

* * * * *